United States Patent [19]

Onulak

[11] 4,150,583
[45] Apr. 24, 1979

[54] CHAIN LINK AND METHOD FOR FORMING THE SAME

[75] Inventor: Eugene W. Onulak, Huntington, Ind.

[73] Assignee: Allied-Locke Industries, Incorporated, Dixon, Ill.

[21] Appl. No.: 820,614

[22] Filed: Aug. 1, 1977

[51] Int. Cl.² ............................................... F16G 13/02
[52] U.S. Cl. ..................................................... 74/248
[58] Field of Search ................. 74/248, 250 R, 245 R; 59/90, 91, 92

[56] References Cited

U.S. PATENT DOCUMENTS

| 518,307 | 4/1894 | Corscaden | 74/248 |
| 1,403,674 | 1/1922 | Dull | 74/248 |
| 1,555,577 | 9/1925 | Horner | 74/248 X |
| 1,834,173 | 12/1931 | Paradise | 74/248 |
| 2,672,059 | 3/1954 | Graetz et al. | 74/248 |
| 2,679,762 | 6/1954 | Paulsen | 74/249 |

Primary Examiner—Leonard H. Gerin
Attorney, Agent, or Firm—Morsbach & Pillote

[57] ABSTRACT

An improved chain link comprised of a two piece barrel, a pin and a sprocket engaging aperture. The chain link of the invention is formed from a blank having a body portion with a tongue attached to one end thereof. The tongue is formed into a barrel hook. A flap is taken from the inside of the body portion and formed toward the barrel hook to form the remainder of the barrel and the sprocket engaging aperture of the chain link. The pin is formed from the other end of the body portion.

7 Claims, 2 Drawing Figures

CHAIN LINK AND METHOD FOR FORMING THE SAME

BACKGROUND OF THE INVENION

1. Field of the Invention

This invention relates to sprocket chains, and more particularly, to an improved chain link construction for such a chain and method for forming the same.

2. Description of the Prior Art

Relatively inexpensive drive or sprocket chains suitable for any type of transmission and conveyor purposes are in great demand since they are capable of a wide variety of applications in modern industry. Such chains are frequently used under very difficult running conditions with regular maintenance at a minimum. These chains are also used outdoors where weather and abrasion factors become a problem. One broad field of application for such chains occurs in various types of agricultural machinery. It is therefore highly desirable to provide a chain link that is both relatively inexpensive to manufacture and has good durability under such conditions.

While prior art chains have been sufficient for the equipment of the past, the sophisticated needs of the modern farmer require that better chains be used. Prior art chain links have been made from blanks formed from materials sheared from one end of the blank or from material sheared from the inside of the blank. This shearing creates sharp corners which, in turn, create crack propagation sites at the intersection of the barrel with the remainder of the chain link. Also, prior art chain links have included pin portions having similar crack propogation sites associated therewith. These crack propogation sites facilitate the formation of cracks during normal use with the result being a premature failure of the chain link. Thus, it is highly desirable to provide a chain link having a relative scarcity of crack propogation sites adjacent both the barrel and pin portions thereof.

In those prior art chain links in which one end of the blank is formed into a barrel of an almost completely circular configuration, the working of the blank associated with the formation of the one-piece barrel or the assembly or disassembly of a link may cause the barrel to become embrittled. This embrittlement also can facilitate the premature failure of the link during operation. Thus, it is highly desirable to provide a chain link minimizing such embrittlement characteristics in the barrel thereof.

Those prior art chain links in which one end of the blank is formed into a barrel of an almost completely circular configuration also are limited with regard to the gauge of the steel from which the links can be made. Thus, it is highly desirable to provide such a chain link which can be made of heavier gauge steel than heretofore possible.

The barrel of prior art one-piece barrel chain links is generally sheared from one end or the inside of a blank. Consequently, when the chain is driven is in both directions reversed, the pins of the links ride against the free end of the barrel and the chain link often fails for one of two reasons. In some situations, pressure exerted by the pin causes the free end of the barrel to lift up which allows the pin to be disengaged from the barrel. In other situations, the pressure exerted by the pin will cause the barrel to pull out from the remainder of the chain link due to the fact that it is sheared from the inside of the blank and the applied stress is parallel to the direction in which the barrel was formed. When the chain is driven in only one direction these problems are not as severe. However, with the increased sophistication of modern industry, often times chains are required to handle operating stresses when driven in both clockwise and counterclockwise directions. Thus, it would be highly desirable to provide an improved chain link having a barrel that can withstand operating stresses when driven in both clockwise or counterclockwise directions.

SUMMARY OF THE INVENTION

It is an object of the invention to provide an improved chain link and method for forming the same.

It is an object of the invention to provide an improved chain link that is relatively inexpensive to manufacture and that provides the strength and wear properties needed by modern industry.

It is another object of the invention to provide an improved chain link having an absence of crack propogation sites.

It is another object of the invention to provide an improved chain link having a barrel that is formed with a minimal amount of cold working thereof.

It is another object of the invention to provide an improved chain link having a barrel which has requisite strength and wear properties to allow chains comprising said lengths to be driven in both clockwise and counterclockwise directions.

It is another object of the invention to provide an improved chain link that which can be manufactured from heavier gauge steel than heretofore possible.

It is another object of the invention to provide an improved chain link which can be sold as separate links and assembled into a chain of a desired length by the end user without working the barrel portion of the link sufficiently to cause embrittlement which may result in chain failure.

It is another object of the invention to provide an improved chain comprising links to which additional links can be added and from which links can be subtracted by the end user without working of the barrel portion of the link sufficiently to cause embrittlement which may result in chain failure.

And finally, it is a further object of the invention to provide an improved chain link which will meet all of the above objects and yet be relatively inexpensive to manufacture, rugged, and durable.

The invention is an improved chain link comprised of a two piece barrel, a pin and a sprocket engaging aperture and method for forming the same. The chain link of the invention is formed from blank having a body portion with a tongue attached to one end thereof. The tongue is formed into a barrel hook. A flap is taken from the inside of the body portion and formed toward the barrel hook to form the remainder of the barrel and the sprocket engaging aperture of the chain link. The pin is formed from the other end of the body portion.

BRIEF DESCRIPTION OF THE DRAWINGS

The above mentioned and other features and objects of this invention and the manner of attaining them will become more apparent and the invention itself will be best understood by reference to the following description of the invention taken in conjunction with the accompanying drawings wherein.

DESCRIPTION OF A SPECIFIC EMBODIMENT

Figure 1:
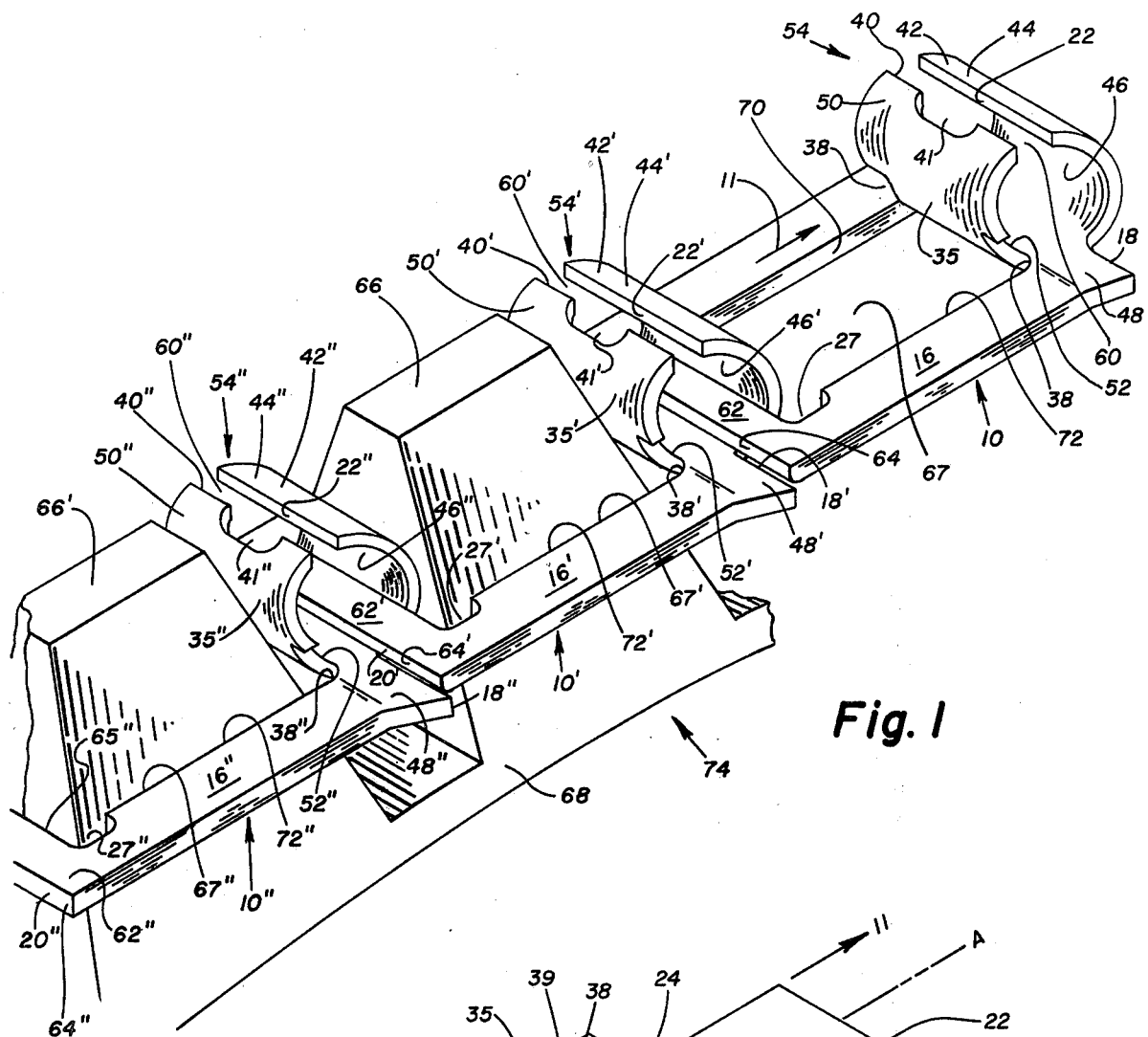
FIG. 1 is a perspective view of a plurality of the chain links of the invention connected together and a fragmentary view of a sprocket wheel with sprockets engaging two of the links.

Referring to the figures, chain links 10 of the invention assembled on a sprocket wheel and a blank 12 from which chain links 10 are formed are both shown. Blank 12 is blanked from flat-rolled stock and has a longitudinal axis A—A which is parallel to the rolling direction 11 of the stock from which chain links 10 are formed. Blank 12 has a tongue portion 14 and a body portion 16. Body portion 16 is of a generally rectangular shape and has opposite ends 18 and 20.

Tongue portion 14 is connected to body portion 16 at end 18 thereof. Tongue portion 14 has one distal or free end 22. The width of end 18 is greater than that of end 22. Tongue 14 and body portion 16 are connected at radiused corners 24 and 25.

A generally rectangular portion of blank 12 is removed therefrom leaving aperture 26. Aperture 26 is enlarged adjacent end 20 to allow for additional barrel width, if desired, by removing opposite portions 27, 28 from blank 12. Portions 27, 28 are generally rectangular in shape, and have radiused interior corners 29, 30. Portions 27, 28 are both opposite each other and extend in opposite directions from side surfaces 32, 34 respectively. Aperture 26 has opposite side surfaces 32 and 34.

A flap 35 is formed from blank 12 by shearing along lines 36 and 37 thereof. Lines 36 and 37 are extensions of side surfaces 32 and 34, respectively. Both lines 36 and 37 are provided with stress relief ends 38. Ends 38 on specific embodiments may be simply bores tangential to lines 36, 37, or may be the elongated bores 39 as shown or other stress relief configurations. Flap 35 is connected to body portion 16 adjacent end 18 thereof and has a distal or free end 40. Preferably, the stress relief configurations of ends 38 are taken from the material of flap 35. Thus, flap 35 adjacent distal end 40 has a dimension taken transversely of axis A—A greater than a like dimension taken through ends 38. In a specific embodiment, a depression 41 may be formed in distal end 40, as shown.

Tongue 14 is formed upward into a semi-cylindrical shape so that tongue 14 defines barrel hook 42 of the chain link 10. Barrel hook 42 has an exterior sprocket bearing surface 44 and an interior pin bearing surface 46. Flap 35 is similarly formed upward and toward barrel hook 42 so as to have an exterior sprocket bearing surface 50 and an interior pin bearing surface 52. Flap 35 and barrel hook 42 each form approximately one-half of barrel 54, and when taken together define barrel 54 of chain link 10. A gap 60 is located between the ends 22 and 40 of barrel hook 42 and flap 35, respectively. Portion 48 of body portion 16 adjacent end 18 thereof is formed downward and away from barrel hook 42 allowing for desired interlink movement.

Pin 62 of the invention is comprised of body portion 16 adjacent end 20 thereof. Pin 62 is formed, for example by coining and scoring, so as to have an exterior bearing surface 64 that engages interior pin bearing surface 52 of barrel 54 and an interior bearing surface 65 that engages interior bearing surface 46. The space once occupied by flap 35 prior to being formed toward barrel hook 42 and aperture 26 of body portion 16, when taken together, form sprocket slot 67 through which a sprocket such as sprocket 66 of sprocket drive wheel 68, may extend. Sprocket slot 64 has opposite side sprocket bearing surfaces 70 and 72. Bearing surfaces 70, 72 are defined by aperture side surfaces 32 and 34 and shear lines 36 and 37.

Figure 2:
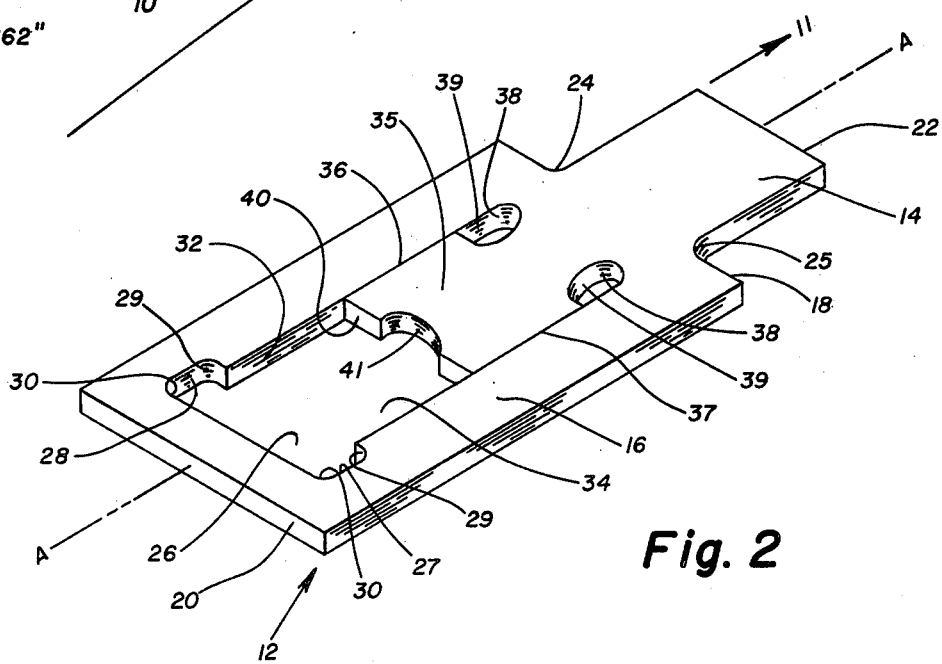
FIG. 2 is a perspective view of the blank from which the chain link of the invention is formed.

In operation, a plurality of the chain links 10 of the invention are attached in succession to form a chain belt 74. Each of the chain links 10 are identical. Like reference numerals are used in FIG. 2 to refer to like structure. Primes and double-primes are used to refer to different links. Chain links 10 are attached by positioning pin 62 within barrel 54' of an adjacent chain link 10', and the subsequent closing of gap 60' a sufficient distance so as to prohibit the travel of pin 62 therethrough. Conventionally, chain 74 is extended between two sprocket wheels, one of which is sprocket drive wheel 68. Sprocket 66 passes through sprocket slot 67' so as to be engaged therein. Sprocket 66 is in contact with exterior sprocket bearing surface 50' of flap 35', exterior sprocket bearing surface 44" of barrel hook 42", and the opposite side sprocket bearing surfaces 70' (not shown) and 72' of sprocket slot 67'

When sprocket drive wheel 68 is driven counter-clockwise, pin 62 will be engaged by barrel hook 42'. Both barrel hook 42' and pin 62 have stresses exerted thereon, however, both these portions of the chain link 10 of the invention are better able to withstand these stresses than prior art constructions since (1) the barrel hook 42' is formed in a direction opposite to the forces applied; (2) the corners 24' and 25' of tongue 14' and corners 30 of pin 62 are radiused to minimize the formation of cracks at the corners; and (3) the barrel hook 42' is formed to a lesser degree than prior art barrels thereby minimizing the embrittlement thereof due to forming.

Sophisticated equipment occasionally requires that the direction in which chain belt 74 is driven occasionally be reversed. When sprocket drive wheel 68 is driven clockwise, pin 62 will engage bearing surface 52' of flap 35'. Both flap 35' and pin 62 will have stresses exerted thereon, and both can withstand these stresses better than prior art constructions since (1) 35' is formed in a direction opposite to the forces applied; (2) the ends 38' and the corners 30 are radiused to minimize the formation of cracks, and (3) flap 35' is formed to a lesser degree than prior art barrels thereby minimizing the embrittlement thereof due to forming.

When sprocket drive wheel 68 is driven in either direction, sprocket 66 and 66' periodically will be forced against the external bearing surfaces 50' and 44" of barrel 54' and 54" of chain links 10' and 10". The action of the sprockets 66 and 66' against the barrels 54 and 54' will prevent the gaps 60' and 60" from widening. Consequently, there exists little chance that the pins 62' and 62" can become dislodged from the barrels 54' and 54" of the chain links 10' and 10" during use.

Chain link 10 also allows the end user to purchase individual links, to assemble a chain of a desired length, and to assemble a link on or disassemble a link from an existing chain if desired. To accomplish the assembly of two links 10 or the disassembly of a link 10 from an existing chain, the gap 60 merely has to be widened sufficiently to allow pin 62 to pass therethrough, and once the pin 62 is positioned within the desired barrel 54 of an adjacent link, the gap 60 must be narrowed so as to prevent the pin 62 from subsequently unintentionally being removed from the barrel 54. The widening of the gap 60 can be easily accomplished by inserting a tool in the gap 60 and prying the barrel hook 42 and the flap 35 apart. This procedure is enhanced by the provision of the depression 41 inasmuch as the gap 60 and the depression 41 will allow several thicknesses of tools to be used for this purpose and minimizes the respective movement between flap 35 and barrel hook 42 required for the pin 62 to pass through the gap 60. Due to the unique formation of the barrel 54 by the barrel hook 42 and flap 35, a minimum of movement of barrel hook 42 and/or flap 35 will allow the pin 62 to pass through gap 60. This required small movement of the flap 35 and/or the barrel hook 42 in enlarging the gap 60 and closing the gap 60 while assembling or disassembling chain links, renders the assembly or disassembly easier than heretofore possible and minimizes the cold working of the barrel 54 resulting in less embrittlement thereof and reduced barrel failures. Since barrel 54 is formed of two essentially semi-cylindrical portions defined by the barrel hook 42 and flap 35, both barrel hook 42 and flap 35 have been found to have essentially the same resistance to bending. It has been found that a purchaser of chain links of the type described herein can assemble and disassemble chain links by using pry bars and hammers such as those conventionally available to owners of heavy machinery.

The invention thus provides an improved chain link which can be used in a wide variety of applications and under very difficult running conditions with minimum regular maintenance. During the manufacture of the chain links of the invention, both crack propogation sites and embrittlement due to cold working are minimized. The chain link of the invention can be made of heavier gauge steel than heretofore possible and allows the end user to purchase individual links and assemble a chain of desired length and to assemble or disassemble a link from an existing chain, if desired. Bearing surfaces 44, 46 of barrel hook 42 and bearing surfaces 50, 52 of flap 35 spread evenly over the entire bearing surface area the contact of the barrel 154 with the pins 62 and the sprockets 66 thus reducing both pin and sprocket wear. The chain link of the invention can be manufactured relatively inexpensively from a minimum of material and has better durability than prior art chain links when driven in either direction.

While there have been described above the principles of this invention in connection with specific apparatus, it is to be clearly understood that this description is made only by way of example and not as a limitation to the scope of the invention.

What is claimed is:

1. An improved chain link comprising an integral link member including a body portion having opposite ends, a barrel located at one of said ends, a pin being located at the other of said ends, and a sprocket engaging aperture being located within said body portion between said barrel and pin; said barrel being defined by a barrel hook and flap, said barrel hook being at said one body portion end and formed toward said body portion, said flap being adjacent to said one body portion end and formed toward said barrel hook, both said flap and barrel hook having a distal end, said distal ends being adjacent and spaced from each other, said flap having an exterior sprocket bearing surface and an interior pin bearing surface, said barrel hook having an exterior sprocket bearing surface and an interior pin bearing surface, said sprocket engaging aperture having opposite side sprocket bearing surfaces, the corners of said sprocket engaging aperture having a stress-relieving configuration, the width of said sprocket aperture adjacent the other of said body portion ends being greater than the width of said barrel, said flap and barrel hook each defining approximately one-half of said barrel and each are arcuate in shape.

2. The improved chain link of claim 1 wherein said barrel hook and said flap are both approximately of a semi-cylindrical configuration of about the same diameter.

3. The improved chain link of claim 1 wherein said barrel hook is of a constant width less than the width of said body portion, and said barrel hook and said body portion are connected at corners having a stress-relieving configuration.

4. The improved chain link of claim 1 wherein said one body portion end is bent in a direction away from said barrel hook.

5. The improved chain link of claim 1 wherein said flap has a depression formed in its distal end intermediate the opposite sides thereof.

6. An improved chain link comprising an integral link member including a body portion having opposite ends, a barrel located at one of said ends, a pin being located at the other of said ends, and a sprocket engaging aperture being located within said body portion between said barrel and pin; said barrel being defined by a barrel hook and flap, said barrel hook being at said one body portion end and formed toward said body portion, said flap being adjacent to said one body portion end and formed toward said barrel hook, both said flap and barrel hook having a distal end, said distal ends being adjacent each other, said flap having a width at its end adjacent said one body portion end which is less than the width of said sprocket engaging aperture adjacent said one body portion end and said flap having a width at said distal end which is larger than the width of said flap adjacent said one body portion end, said flap and body portion being connected at corners having a stress-relieving configuration.

7. An improved chain link comprising an integral link member including a body portion having opposite ends, a barrel located at one of said ends, a pin being located at the other of said ends, and a sprocket engaging aperture being located within said body portion between said barrel and pin; said barrel being defined by a barrel hook and flap, said barrel hook being at said one body portion end and formed toward said body portion, said flap being adjacent to said one body portion end and formed toward said barrel hook, both said flap and barrel hook having a distal end, said distal ends being adjacent each other, said flap having a width adjacent said one body portion end which is less than the width of the sprocket engaging aperture adjacent said one body portion end, the width of said sprocket engaging aperture adjacent the other of said body portion ends being greater than its width adjacent said one body portion end and greater than the width of said barrel hook, said flap having a width at its distal end which is larger than its width adjacent said one body portion end, said flap and said one end of said body portion being connected at corners having a stress-relieving configuration.

* * * * *